US 10,618,800 B2

(12) United States Patent
Matsumura et al.

(10) Patent No.: US 10,618,800 B2
(45) Date of Patent: Apr. 14, 2020

(54) SKIN-MATERIAL FIXING CLIP (71) Applicant: YKK Corporation, Tokyo (JP)

(72) Inventors: Genta Matsumura, Tokyo (JP);
Tomonari Yoshida, Tokyo (JP);
Ryuichi Murasaki, Tokyo (JP);
Yoshitomo Iyoda, Tokyo (JP); Yuka
Makino, Tokyo (JP); Tsutomu
Yamada, Tokyo (JP)

(73) Assignee: YKK Corporation (JP)

( * ) Notice: Subject to any disclaimer, the term of this patent is extended or adjusted under 35 U.S.C. 154(b) by 12 days.

(21) Appl. No.: 15/571,036

(22) PCT Filed: May 1, 2015

(86) PCT No.: PCT/JP2015/063126
§ 371 (c)(1),
(2) Date: Oct. 31, 2017

(87) PCT Pub. No.: WO2016/178275
PCT Pub. Date: Nov. 10, 2016

(65) Prior Publication Data
US 2018/0162719 A1 Jun. 14, 2018

(51) Int. Cl.
A43C 7/00 (2006.01)
B68G 7/052 (2006.01)
(Continued)

(52) U.S. Cl.
CPC .............. *B68G 7/052* (2013.01); *A47C 31/02* (2013.01); *A47C 31/023* (2013.01); *B60N 2/5825* (2013.01); *B68G 7/12* (2013.01)

(58) Field of Classification Search
CPC ........ B68G 7/052; B68G 7/12; B60N 2/5825; A47C 31/02; A47C 31/023
See application file for complete search history.

(56) References Cited

U.S. PATENT DOCUMENTS 4,691,416 A 9/1987 Nakayama et al.
6,048,025 A 4/2000 Tillner
(Continued)

FOREIGN PATENT DOCUMENTS

CN 101031224 A 9/2007
CN 101336786 A 1/2009
(Continued)

OTHER PUBLICATIONS

International Search Report, PCT Patent Application No. PCT/JP2015/063126, dated Jun. 9, 2015.
(Continued)

Primary Examiner — Victor D Batson
Assistant Examiner — Matthew J Sullivan
(74) Attorney, Agent, or Firm — Kilpatrick Townsend & Stockton LLP (57) ABSTRACT There is provided a skin-material fixing clip for connecting a skin material with a cushion material and provided with a locking section and a hook. The hook is provided with an extension portion extending downward from the locking section and a claw-shaped portion extending laterally from a distal end of the extension portion. The locking section is provided with a wire guide piece. A groove portion surrounded by the claw-shaped portion and the extension portion defines a wire holding space. Parts of the wire guide piece and the claw-shaped portion facing the wire insertion opening defines guide surfaces. The distal end portion of the wire guide piece and the distal end portion of the claw-shaped portion are provided to be spaced from each other along a direction parallel to an extending direction of the groove portion.

12 Claims, 7 Drawing Sheets (51) Int. Cl.
*A47C 31/02* (2006.01)
*B68G 7/12* (2006.01)
*B60N 2/58* (2006.01)

(56) References Cited

U.S. PATENT DOCUMENTS

| | | | |
|---|---|---|---|
| 7,901,002 B2* | 3/2011 | Mashimo | B60N 2/5825 297/218.3 |
| 9,526,302 B2* | 12/2016 | Saiga | B60N 2/5825 |
| 9,663,007 B2* | 5/2017 | Murasaki | B60N 2/5825 |
| 9,743,777 B2* | 8/2017 | Saiga | A47C 31/023 |
| 9,827,890 B2* | 11/2017 | Saiga | B60N 2/5825 |
| 2007/0257531 A1 | 11/2007 | Mashimo | |
| 2008/0309145 A1 | 12/2008 | Brandtner | |
| 2009/0140569 A1 | 6/2009 | Mashimo | |
| 2012/0284974 A1* | 11/2012 | Yamamoto | A47C 31/023 24/458 |
| 2013/0117973 A1 | 5/2013 | Murasaki et al. | |
| 2016/0174719 A1* | 6/2016 | Saiga | A47C 31/023 24/531 |

FOREIGN PATENT DOCUMENTS

| | | |
|---|---|---|
| CN | 101416829 A | 4/2009 |
| JP | 2007-275557 A | 10/2007 |
| JP | 2011-224241 A | 11/2011 |
| JP | 2012-217759 A | 11/2012 |
| JP | 2012-235911 A | 12/2012 |
| JP | 2014-204780 A | 10/2014 |
| WO | 2012-017986 A1 | 2/2012 |

OTHER PUBLICATIONS

Written Opinion, PCT Patent Application No. PCT/JP2015/063126, dated Jun. 9, 2015.

Office Action, Korean Patent Application No. 10-2017-7031539, dated Mar. 22, 2019.

Office Action, Chinese Patent Application No. 201580079549.7, dated Aug. 27, 2019.

\* cited by examiner

SKIN-MATERIAL FIXING CLIP

This application is a national stage application of PCT/JP2015/063126, which is incorporated herein by reference.

TECHNICAL FIELD

The present invention relates to a skin-material fixing clip used for fixing a skin material intended to cover a surface of chairs, seats or the like.

BACKGROUND ART

Conventionally, in chairs used indoors, seats of vehicles or the like, things are often used in which a cushion material or flexible pad is installed on a part thereof to be touched by a human body, such as a seat surface or a back rest and then a surface thereof is covered with a skin material. Various structures are employed to fix the skin material. As structures capable of externally concealing while fixing the skin material, a structure is known in which a wire is arranged in a groove of a cushion material, clips are arrayed on an end edge of the skin material and then the clips are engaged with the wire, thereby fixing the skin material. Each of the clips has a chuck portion configured to be engaged to a locking end attached on the skin material and a hook portion configured to be caught and locked on the wire installed in the groove of the cushion. In order to facilitate an operation of catching the hook portion on the wire, hook portions having various shapes are known.

For example, a skin-material fixing clip disclosed in Patent Document 1 has a pair of leg portions formed to sandwich a wire therebetween. In a second embodiment of this invention, the pair of leg portions has a cut out portion and is arranged in a staggered manner in a wire direction while being at a short distance from each other in a length direction thereof, so that an actual space of a lead-in passage becomes wider. Therefore, the wire can be easily led into a locking space of the clip member, thereby allowing locking of the wire to be simply performed.

Also, a skin-material fixing clip disclosed in Patent Document 2 has a pair of upstanding pieces formed to interpose a wire therebetween and a hanging claw formed on an upper end of each of the upstanding pieces to clasp the wire. The pair of right and left upstanding pieces is provided to be stood up in a staggered manner while being at the same distance from each other as a width of the right and left upstanding pieces in an axial direction of the wire. A distance between the right and left upstanding pieces is formed to have a proper gap wider than at least a thickness of the wire. Therefore, in order to allow the wire to pass through the gap between the right and left hanging claws without pressing the hanging claws against the wire with a strong force, the clip is fitted onto the wire at an angle relative to the wire. Then, the clip is twisted so that the right and left hanging claws are arranged to be parallel to the wire and thus to clasp the wire. As a result, the clip can be easily mounted onto the wire without exerting a storing force thereon.

Further, skin-material fixing clips disclosed in Patent Documents 3 and 4 have a guide piece and a hook arranged side by side to oppose each other, and the guide piece is configured to be connected to a chuck portion and reach the vicinity of a distal end of the hook. As a wire is inserted between the guide piece and the hook, the guide piece is bent outward to widen a gap therebetween. When the wire is further inserted, the hook is caught and locked on the wire inserted in the gap.

Figure 12:
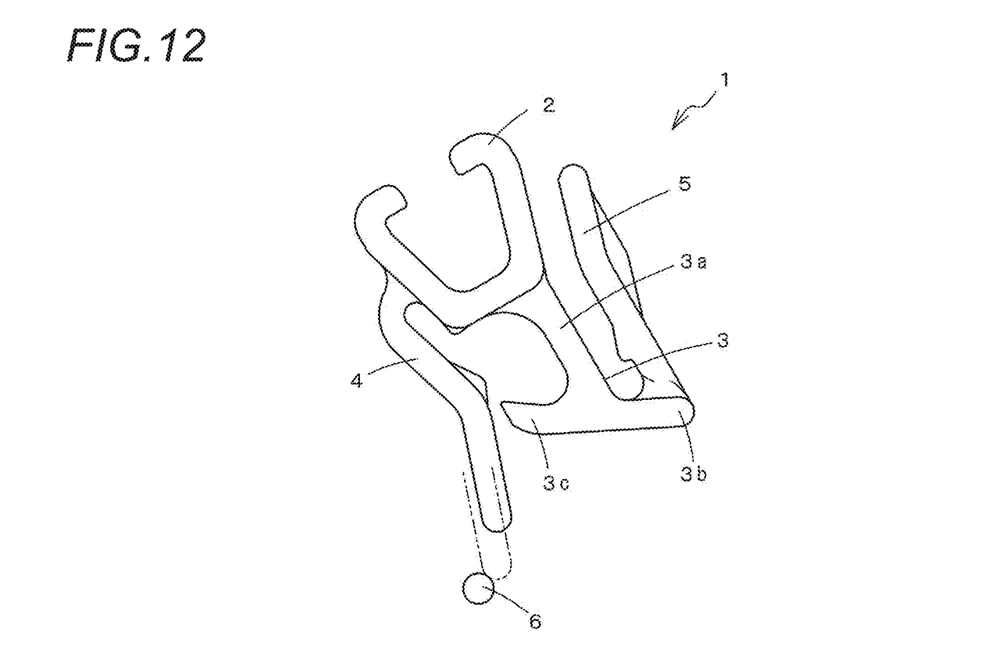
FIG. 12 is a front view showing a method of attaching a conventional skin-material fixing clip to a wire.

An example of a skin-material fixing clip having such a guide piece is shown in FIG. 12. The skin-material fixing clip 1 shown in FIG. 12 has a locking section 2 constituted of a pair of locking claws configured to be engaged to a locking end attached on a skin material, a hook 3 configured to be caught and locked on a wire installed in a groove of a cushion material, and a guide piece 4 arranged side by side with the hook 3 to oppose the hook 3. The hook 3 has an extension portion 3a extending downward in the figure, a claw-shaped portion 3c configured to be bent from a distal end of the extension portion 3a in a left direction in the figure and then to be slightly inclined upward, and a flange portion 3b extending in a direction (right direction in FIG. 12) opposite to the extending direction of the claw-shaped portion 3c. The flange portion 3b has a distal end inclined downward, and a jig receiving portion 5 configured to allow a jig for separating the hook 3 from a wire 6 to be locked therein is provided on the distal end of the flange portion 3b. The guide piece 4 extends downward in the figure while being curved, so that the guide piece 4 passes by a lateral side of the claw-shaped portion 3c of the hook 3 and then reaches a lateral side of a location substantially corresponding to a lower end portion of the flange portion 3b. The skin-material fixing clip 1 is configured so that as the wire 6 is inserted between the guide piece 4 and the hook 3, the guide piece 4 is bent outward to widen a gap between the guide piece 4 and the hook 3 and then when the wire 6 is further inserted, the hook 3 is caught and locked on the wire 6 inserted in the gap.

In addition, as other configurations in which a hook is caught and locked on a wire, a configuration as described in Patent Document 5 is known in which a cantilever-shaped closing piece capable of being elastically deformed is provided in an opening portion provided above the hook.

PRIOR ART DOCUMENT

Patent Document

Patent Document 1: Japanese Patent Application Publication No. 2007-275557A
Patent Document 2: Japanese Patent Application Publication No. 2011-224241A
Patent Document 3: Japanese Patent Application Publication No. 2012-235911A
Patent Document 4: WO 2012/017986
Patent Document 5: U.S. Pat. No. 4,691,416

SUMMARY OF INVENTION

Problems to be Solved by Invention

The skin-material fixing clips disclosed in Patent Documents 1 and 2 of the above background arts have no guide piece provided to be easily elastically deformed while guiding the wire, and an operation of attaching the clips on the wire is not sufficiently easy. Also, in the case of the skin-material fixing clip 1 shown in FIG. 12, if the skin-material fixing clip 1 is inclined when approaching the wire 6 in order to be locked thereon, the wire 6 is likely to be located on the outside of the guide piece 4 as shown in FIG. 12 and thus not to be caught by the hook 3, since the guide piece 4 extends downward relative to the hook 3. In this case, the hook 3 has to be inserted again after correcting the posture thereof, thereby causing a locking operation of the hook 3 to be troublesome. Also, a range allowing the wire 6 to be inserted into the hook 3 is narrow, and thus in order to precisely insert the wire 6, the surrounding cushion material and the like has to be pressed and deformed to be flattened, thereby causing the wire 6 to be visible. This operation has to be performed with a strong force and thus is not easy. In particular, if attempting to catch the skin-material fixing clip 1 on the wire 6 by pressing the skin-material fixing clip 1 with a finger, the skin-material fixing clip 10 is prone to be inclined so that the guide piece 4 is moved downward as shown in FIG. 12. Thus, the wire 6 is often located on the outside of the guide piece 4, thereby making it difficult to engage the wire 6 with the hook 3.

Similarly, the skin-material fixing clips disclosed in Patent Documents 3 and 4 are also configured so that the guide pieces thereof are extended longer, thereby making it difficult to catch the clips on the wire.

Further, the hook member disclosed in Patent Document 5 is provided with the opening portion above the hook. Therefore, in order to release the hook locked on the wire, the hook has to be pressed down below the wire, thereby requiring a force and thus making it difficult to use the hook member. Also, the opening portion is closed by the closing piece. Therefore, when the wire is separated, the hook member has to be operated while maintaining the closing piece in an opened state, thereby making the operation difficult.

The present invention has been made keeping in mind the problems of the above background arts, and an object thereof is to provide a skin-material fixing clip, which can be easily locked on a wire, which is located within a cushion material or the like, by a simple operation and has a good work efficiency.

Means for Solving Problems

According to the present invention, there is provided a skin-material fixing clip for connecting a skin material with a cushion material and provided with a locking section configured to be locked on a locking end material provided on an end edge of the skin material and a hook configured to be locked on a wire installed in the cushion material, wherein the hook is provided below the locking section and the hook is provided with an extension portion extending downward from the locking section and a claw-shaped portion extending laterally from a distal end of the extension portion, wherein the locking section is provided with a wire guide piece, wherein the wire guide piece extends downward from the locking section and then is provided with a bent portion in the middle thereof to be bent and extended toward a distal end portion of the claw-shaped portion of the hook, wherein a distal end portion of the wire guide piece is positioned so that a wire insertion opening having a predetermined gap and configured to allow the wire to be inserted therethrough is formed between the distal end portion and the distal end portion of the claw-shaped portion, wherein a groove portion surrounded by the claw-shaped portion and the extension portion defines a wire holding space extending along an inserting direction of the wire, wherein parts of the wire guide piece and the claw-shaped portion facing the wire insertion opening defines guide surfaces, respectively, wherein the distal end portion of the wire guide piece and the distal end portion of the claw-shaped portion are provided to be spaced from each other along a direction parallel to an extending direction of the groove portion.

An elastic piece portion, which extends from the bent portions to the distal end portion of the wire guide piece, and the distal end portion of the claw-shaped portion are spaced from each other along the direction parallel to the extending direction of the groove portion, and the guide surface of the wire guide piece is parallel to the extending direction of the groove portion. Also, the wire guide piece is formed so that a thickness of the elastic piece portion in a direction along the guide surface is thinner than a thickness of a part of a base portion, which extends from the locking section to the bent portion, in a direction along the guide surface.

The distal end portion of the claw-shaped portion of the hook is formed to have a first end portion protruding toward the locking section and a second end portion opposing the guide surface of the wire guide piece and protruding toward the locking section.

A distance between the guide surfaces, respectively, of the wire guide piece and the claw-shaped portion is gradually narrowed toward the wire insertion opening. Also, the distal end portion of the wire guide piece may be positioned above the distal end portion of the claw-shaped portion. Further, the distal end portion of the wire guide piece may extend beyond the distal end portion of the claw-shaped portion and thus may be positioned toward the extension portion of the hook.

The wire guide piece extends in a direction away from the extension portion as the wire guide piece goes downward from the locking section, and then is provided with the bent portion to be bent and extended toward the distal end portion of the claw-shaped portion of the hook.

Further, the hook has a flange portion extending in a direction opposite to an extending direction of the claw-shaped portion of the extension portion, the flange portion has a distal end formed to be inclined in a direction away from the locking section, and a jig receiving portion configured to allow a jig for separating the hook from the wire to be locked therein, is provided on the distal end of the flange portion.

The locking section, the hook and the wire guide piece are formed by integrally molding using synthetic resin.

Advantageous Effects of Invention

According to the skin-material fixing clip of the present invention, it is possible to easily lock the skin-material fixing clip on a wire, which is located within a cushion material or the like, by a simple operation and thus to easily and reliably attach the skin-material on the cushion material. During a locking operation, even when the skin-material fixing clip is pressed from above with a finger and thus the skin-material fixing clip is inclined, it is possible to reliably catch the wire on the hook in the inclined state and to easily perform locking with the finger, thereby enhancing a work efficiency. Also, since a pair of guide surfaces facing the wire insertion opening defines a lead-in passage having a triangle leg shape, it is unnecessary to precisely position the wire. In addition, it is possible to guide the wire in a wide range and also to allow the wire to be reliably guided and locked into the wire insertion opening.

Also, since the distal end portion of the wire guide piece is positioned above the distal end portion of the claw-shaped portion, the guide surface thereof extending to the wire insertion opening can have an increased length, thereby facilitating guiding the wire upon insertion thereof. Further, since the distal end portion of the wire guide piece extends beyond the distal end portion of the claw-shaped portion and thus is positioned toward the extension portion of the hook, it is possible to reliably guide the wire to a location at which the wire is locked by the claw-shaped portion, thereby reducing a movement range of the wire in the locked state and thus facilitating maintaining the locked state.

In addition, the distal end portion of the wire guide piece and the distal end piece of the hook are provided in a staggered manner to provide gaps, which are wider than a certain size, in different directions, thereby allowing the mold to be removed in the different directions and also making the wire insertion opening narrower. Therefore, it is possible to inhibit movement of the wire in the locked state.

EMBODIMENTS OF INVENTION

Figure 2:
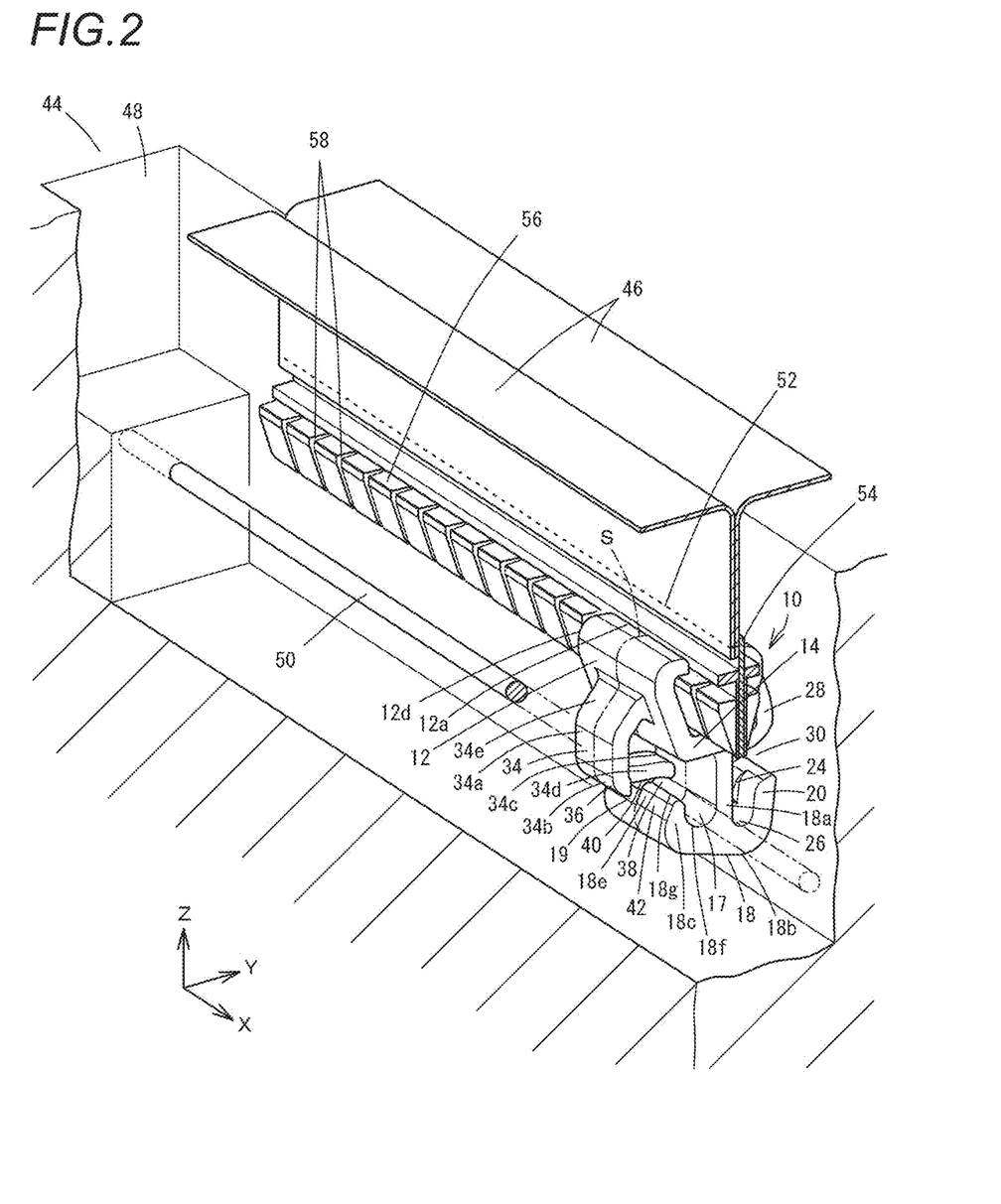
FIG. 2 is a perspective view showing a method of using the skin-material fixing clip of the present embodiment.

Hereinafter, embodiments of the present invention will be described with reference to the drawings. Also, for the description of a skin-material fixing clip 10, directions will be described with reference to XYZ axis directions perpendicular to each other as shown in FIG. 2. Herein, the X-axis direction is referred to as a forward and rearward direction and corresponds to a length direction of a wire 50 arranged, for example, in a deep part of a groove 48 of a cushion material 44 as describe below, i.e., an inserting direction of the wire 50 which is inserted through the cushion material 44, and also to an direction along which an end edge of a skin material 44 extends. Also, the X-axis direction corresponds to a direction along which a locking end material 56 as described below extends. A direction in which the locking end material 56 is inserted into the groove 48 of the cushion 44 to be locked onto the wire 50 is referred to as an upward and downward direction. The upward and downward direction is the Z-axis direction perpendicular to the X-axis direction and corresponds to a depth direction of the cushion material 44. Also, the upward and downward direction corresponds to a direction normal to an outer surface of the skin material 46 as described below attached on the cushion material 44. Further, a direction perpendicular to the X-axis direction, which is the forward and rearward direction, and the Z-axis direction, which is the upward and downward direction, is the Y-axis direction and is referred to as a right and left direction. A direction parallel to the right and left direction is also referred to as a lateral direction.

Figure 1:
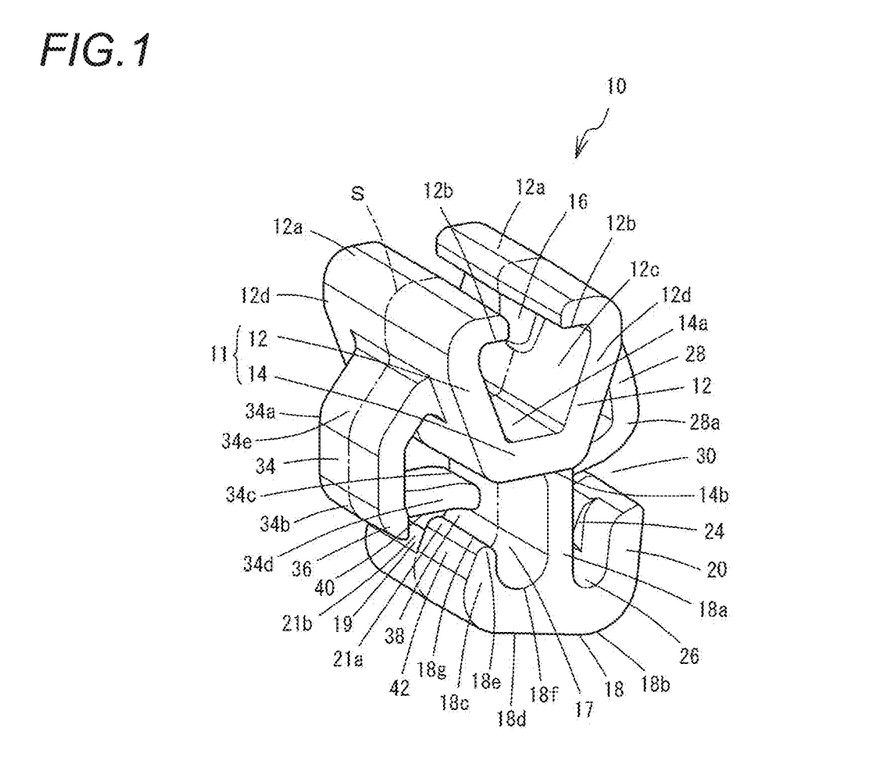
FIG. 1 is a perspective view of a skin-material fixing clip according to one embodiment of the present invention.
Figure 3:
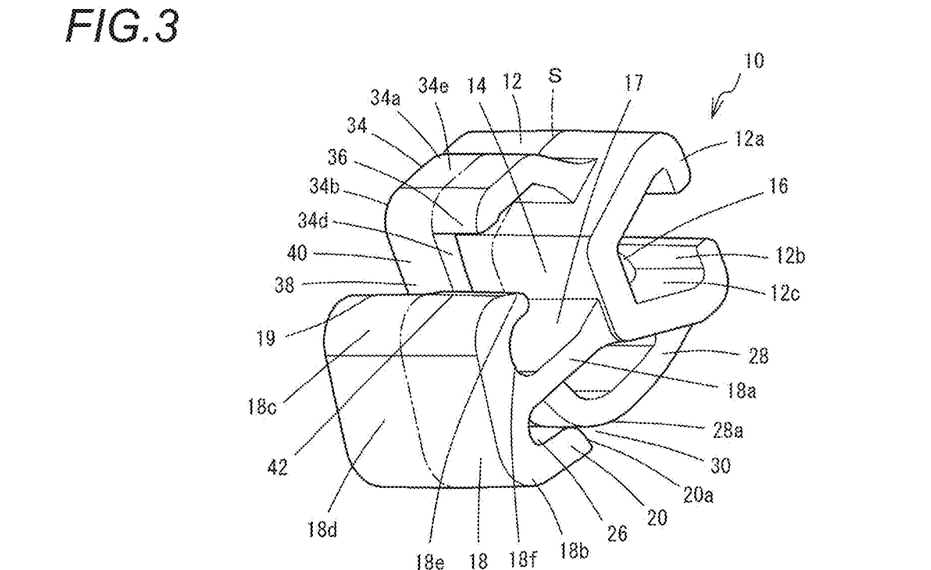
FIG. 3 is a perspective view of the skin-material fixing clip of the present embodiment.
Figure 4:
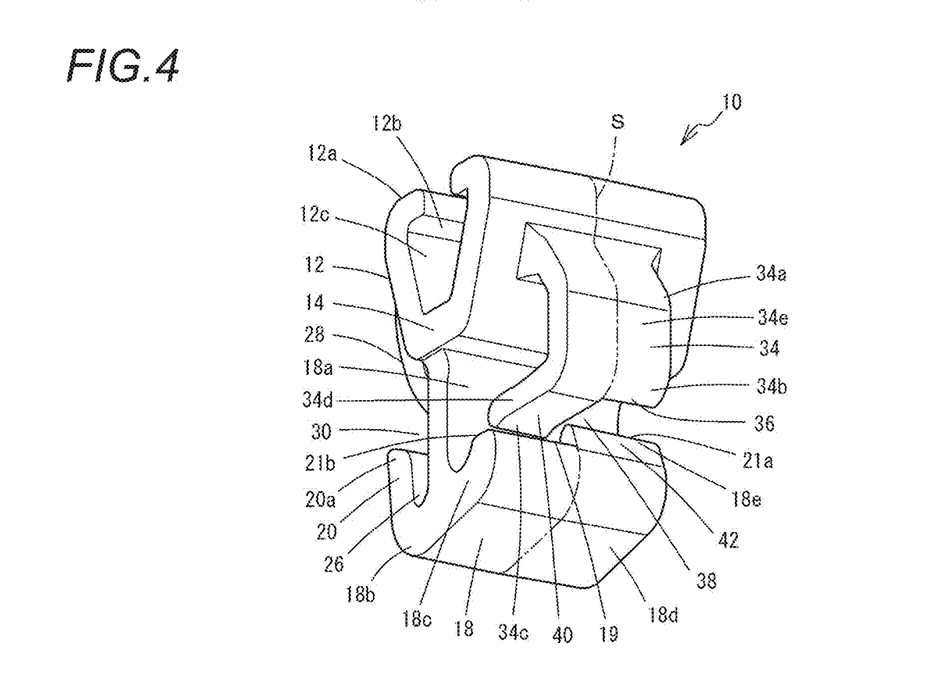
FIG. 4 is a perspective view of the skin-material fixing clip of the present embodiment, as viewed in another direction.

FIGS. 1, 3 and 4 show one embodiment of the present embodiment. A skin-material fixing clip 10 of this embodiment is integrally molded of synthetic resin and has a pair of locking claws 12. The locking claws 12 have respective arm portions 12d formed to oppose each other. Base end portions of the arm portions 12d (also referred to as base end portions of the locking claws 12) are integrally formed from both sides of an upper surface 14a of a locking claw base portion 14 (also referred to as one surface of the locking claw base portion 14), and thus the locking claws 12 are formed to protrude from the upper surface 14a in an upward direction in FIG. 1, so that a distance therebetween in the right and left direction is widened as they go upward. A locking section 11 is formed by the locking claws 12 and the locking claw base portion 14.

Distal end portions 12a of the locking claws 12 are bent inward, i.e., in such directions that the distal end portions 12a face and approach each other. Each of the distal end portions 12a opposes the locking claw base portion 14 and has a locking surface 12b configured to be locked on a locking end material 56. The locking surface 12b is formed to be substantially parallel to the upper surface 14a of the locking claw base portion 14. The locking end material 56 is received and locked in a space surrounded by the pair of locking claws 12 and the locking claw base material 14.

Stoppers 16 are respectively provided on opposing inner surfaces 12c of the arm portions 12d of the pair of locking claws 12. Each of the stoppers 16 is a protrusion provided at a middle location of the respective locking claws 12 in a thickness direction thereof, which is the X-axis direction intersecting a direction in which the locking claws 12 face each other, and has a length starting from the locking surface 12b of the respective locking claws 12 and reaching the middle of the inner surface 12c. A width of the stopper 16 in the thickness direction is substantially constant.

A hook 18 is provided on a lower surface 14b of the locking claw base portion 14 (also referred to as the other surface of the locking claw base portion 14) opposite to the upper surface 14a. The hook 18 has an extension portion 18a provided on one end of the lower surface 14b in the direction, in which the pair of locking claws 12 face each other, and extending downward to be substantially perpendicular to the lower surface 14b, and a claw-shaped portion 18c bent from a distal end of the extension portion 18a in a left direction in FIG. 5 and also inclined toward the locking section 11. The claw-shaped portion 18c is inclined upward toward the locking claw base portion 14. A distal end portion 18e of the claw-shaped portion 18c has a shape bent along a plane, which is substantially perpendicular to an inclined surface 18d, which is a lower surface of the claw-shaped portion 18c, and also is formed to protrude toward the locking claw base portion 14 and to be slightly thinned toward a tip thereof. A U-shaped groove portion 18f surrounded by the extension portion 18a, the claw-shaped portion 18c and the distal end portion 18e is formed to extend in the X-axis direction and defines a wire holding space 17 in which a wire 50 as described below is to be inserted therethrough. Also, as viewed in a Y-Z plane shown in FIG. 5, the inclined surface 18d is not limited to a linear shape, but may have a downwardly convex or upwardly concave curved surface shape.

Figure 6:
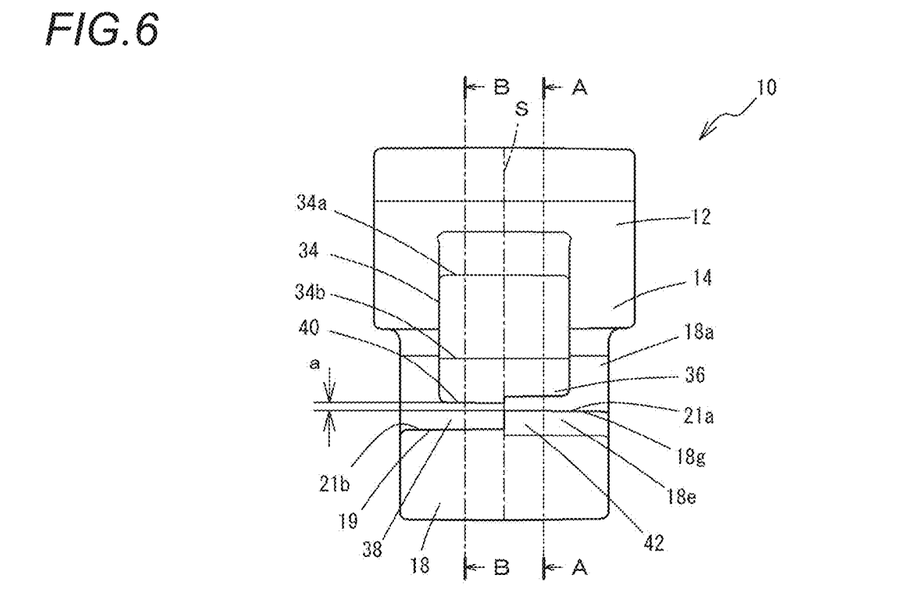
FIG. 6 is a left side view of the skin-material fixing clip of the present embodiment.

The skin-material fixing clip 10 is configured so that the X-axis direction is a width direction thereof and also a shape thereof is generally substantially symmetric with respect to a center line S of the skin-material fixing clip 10 in the width direction, and a shape of the hook 18 in the X-axis direction is formed to have a constant width slightly shorter than a width of the locking claws 12. The claw-shaped portion 18c of the hook 18 has a clearance surface 19 formed in such a manner that a left half with respect to the center line S, as shown in FIG. 6, in a portion thereof, which extends from the middle of the claw-shaped portion 18c in the protruding direction thereof to the distal end portion 18e, is cut out to a predetermine depth. The clearance surface 19 is positioned below an end surface 18g of the right half, which extends along a width direction (X-axis direction) of the distal end portion 18e, in the Z-axis direction. Herein, the end surface 18g of the distal end portion 18e extending along the width direction thereof is referred to as a first end portion 21a, and the clearance surface 19 positioned below the first end surface 21a is referred to as a second end portion 21b. An outer surface of the distal end portion 18e of the hook 18 is configured so that a right half thereof with respect to the center line S in FIG. 6 is formed over about half a width of the hook 18, thereby serving as a guide surface 42 as described below.

The distal end of the extension portion 18a of the hook 18 is provided with a flange portion 18b extending in a direction (right direction in FIG. 5) opposite to the extending direction of the claw-shaped portion 18c. The flange portion 18b is provided to be inclined downward toward an end portion thereof opposite to the claw-shaped portion 18c, and the downward inclined end portion is provided with a jig receiving portion 20 for receiving a jig (not shown).

The jig receiving portion 20 extends from a distal end portion of the flange portion 18b toward the locking claws 12 to be substantially parallel to the extension portion 18a with a distance interposed therebetween, and a distal end portion 20a thereof reaches the vicinity of the middle of the extension portion 18a in a length direction thereof and is positioned laterally from the extension portion 18a. The distal end portion 20a of the jig receiving portion 20 has an inclined surface formed to be oriented upward as it goes away from the extension portion 18a. A U-shaped groove portion surrounded by the extension portion 18a, the flange portion 18b and the jig receiving portion 20 defines a jig holding space 26 in which the jig is to be inserted.

On an inner surface of the jig receiving portion 20 opposing the extension portion 18a, an engaging protrusion 24 is provided to be adjacent to the distal end portion 20a. The engaging protrusion 24 is a protrusion formed in a triangle shape toward the extension portion 18a and protrudes to approach the extension portion 18a as it goes downward. That is, the engaging protrusion 24 is configured so that a surface thereof close to the flange portion 18b is arranged to be substantially perpendicular to the protruding direction of the jig receiving portion 20 and a surface thereof opposite to the flange portion 18b intersects the extending direction of the jig receiving portion 20 at an acute angle. Therefore, when the jig is inserted into the jig holding space 26, a part of the jig can climb over surfaces thereof intersecting each other at an obtuse angle, and thus the jig can be engaged with the engaging protrusion 24 and be held in the jig holding space 26.

Of the pair of locking claws 12, a locking claw 12 on which the jig receiving portion 20 is formed (locking claw 12 on a side opposite to a part on which a wire guide piece 34 as described below is formed) is provided with a jig guide piece 28 integrally formed with the locking claw 12. The jig guide piece 28 is provided in the vicinity of the bent corner portion of the distal end portion 12a of the locking claw 12 and extends in an inclined direction extending downward as it goes away from the locking claw 12. Also, the jig guide piece 28 has a bent portion 28a provided in the vicinity of a lateral side of the lower surface 14b of the locking claw base portion 14. Thus, the jig guide piece 28 is bent toward the extension portion 18a of the hook 18 at the bend portion 28a and then reaches the vicinity of the middle of the extension portion 18a. A distal end portion 28b of the bent jig guide piece 28 reaches a location near to the extension portion 18a beyond an extension line of the distal end portion 20a of the jig receiving portion 20 and thus is positioned at a predetermined distance from the extension portion 18a. The distal end portion 20a of the jig receiving portion 20 and a part between the bent portion 28a and the distal end portion 28b of the jig guide piece 28 are generally parallel to each other, and a gap between the distal end portion 20a of the jig receiving portion 20 and the jig guide piece 28 defines a jig insertion opening 30 through which the jig (not shown) is to be inserted.

A jig holding protrusion 32 is provided at a location on the extension portion 18a of the hook 18 opposing the jig insertion opening 30. The jig holding protrusion 32 is a protrusion formed in a shape of triangle protruding toward the distal end portion 28b of the jig guide piece 28 and is provided with an inclined surface for guiding the jig, which is inserted in the jig insertion opening 30, toward the jig holding space 26.

Of the pair of locking claws 12, a locking claw 12 opposite to the locking claw 12 on which the jig guide piece 28 is formed is provided with a wire guide piece 34 integrally formed with the locking claw 12. The wire guide piece 34 is provided in the vicinity of the middle of the locking claw 12 in the protruding direction thereof and extends in an inclined direction extending downward as it goes away from the locking claw 12. The wire guide piece 34 has a first bent portion 34a provided in the vicinity of a lateral side of the lower surface 14b of the locking claw base portion 14. Thus, the wire guide piece 34 is bent at the first bent portion 34a and then extends vertically downward to be parallel to the extension portion 18a of the hook 18. Also, the wire guide piece 34 has a second bent portion 34b provided at a location near to the middle of the extension portion 18a of the hook 18 and thus is bent at the second bent portion 34b at an angle of about 90o. A distal end portion 34c of the bent wire guide piece 34 extends toward the extension portion 18a of the hook 18 to be substantially perpendicular to the length direction of the extension portion 18a and thus reaches the vicinity of the extension portion 18a.

A shape of the wire guide piece 34 in the X-axis direction is formed to have a constant width slightly shorter than the width of the locking claws 12 and also shorter than the width of the hook 18. A part of the wire guide piece 34, which extends from the second bent portion 34b to the distal end portion 34c, is configured so that a right half thereof with respect to the center line S in FIG. 6 is cut out and the left half thereof forms an elastic piece portion 34d. Thus, the right half of the second bent portion 34 in the X-axis direction defines an edge portion 36 of the cut out space. The elastic piece portion 34d on the left half near to the distal end portion 34c of the wire guide piece 34 is remained uncut to have a width about half the width of the wire guide piece 34, and thus a lower surface thereof forms a guide surface 40. That is, the wire guide piece 34 is formed so that a thickness of the elastic piece portion 34d in a direction along the guide surface 40 as described below is thinner than a thickness of a part of a base portion 34e, which extends from the locking section 11 to the bent portion 34b, in a direction along the guide surface 40.

The elastic piece portion 34d and the distal end portion 34c of the wire guide piece 34 and the distal end piece 18e of the hook 18 are provided to be spaced from each other along an inserting direction of the wire 50, i.e., a direction parallel to the X-axis direction. Here, the term 'spaced' means a state where their positions are offset in the X-axis direction and also a state where, when one side is projected in a direction perpendicular to the X-axis direction, the one side is likely to be in contact with the other side, but does not overlap therewith. The wire guide piece 34 and the hook 18 are provided to coincide with the X-axis direction in the vicinities of their base end portions, but the distal end portion 34c of the wire guide piece 34 is cut out in the right half thereof in FIG. 6 and the distal end portion 18e of the hook 18 is cut out in the left half thereof, so that their distal end portions are spaced from each other and positioned in a staggered manner. That is, a center line of the elastic piece portion 34d of the wire guide piece 34, which extends from the second bent portion 34b to the distal end portion 34c, and a center line of a part of the hook 18, which extends from the middle of the distal end portion 18e in the protruding direction thereof to the end surface 18g (first end portion 21a), are positioned to be spaced from and parallel to each other along the inserting direction of the wire 50, i.e., the direction parallel to the X-axis direction. Also, the guide surface 40 of the elastic piece portion 34d of the wire guide piece 34 is formed to be parallel to a direction in which the groove portion 18f of the hook 18 extends (X-axis direction).

A gap between the wire guide piece 34 and the hook 18 defines a wire insertion opening 38, through which the wire 50 is to be inserted. As viewed in the Y-axis direction, the wire insertion opening 38 is configured so that as shown in FIG. 6, a part thereof in the vicinity of the center line S of the skin-material fixing clip 10 in the X-axis direction is narrowest and has a distance a smaller than a diameter of the wire 50, thereby preventing the wire 50 from falling out after being inserted therethrough and thus reliably holding the wire 50 in the wire holding space 17.

Figure 7:
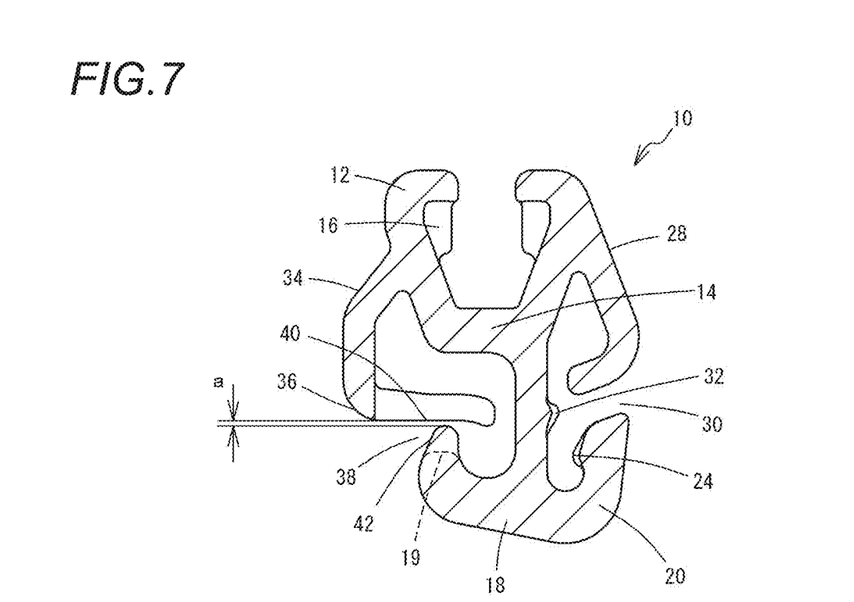
FIG. 7 is a longitudinal sectional view taken along a line A-A in FIG. 6.
Figure 8:
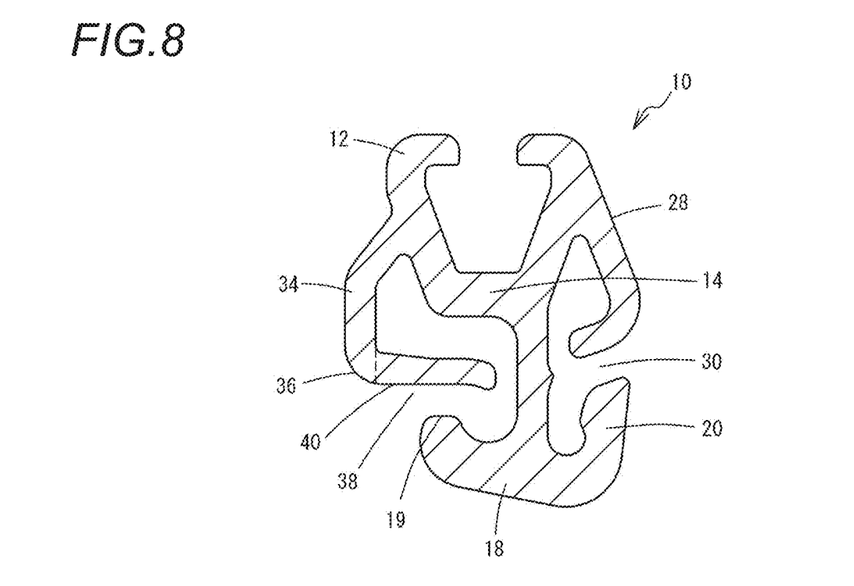
FIG. 8 is a longitudinal sectional view taken along a line B-B in FIG. 6.

A section of the skin-material fixing clip 10, which is located on the right side from the center line S in the X-axis direction in FIG. 6, is cut out in a part of the wire guide piece 34, which oppose the distal end portion 18e of the hook 18, as in a sectional view taken along a line A-A shown in FIG. 7. Thus, the edge portion 36, which is a lower end portion of the wire guide piece 34, and the distal end portion 18e of the hook 18 are offset from each other in the Y-axis direction so that a distance therebetween is wider than the distance a, thereby defining a wider void therebetween. A section of the skin-material fixing clip 10, which is located on the left side from the center line S in the X-axis direction, is cut out in the distal end portion 18e of the hook 18, as in a sectional view taken along a line B-B shown in FIG. 8, thereby causing a distance therebetween to be wider than the distance a and thus defining a wider void. Also, since such wider voids are provided on both sides of the center line S, it is possible to set the distance a to be narrower than thicknesses of corresponding void portions of a mold used in manufacturing.

A lower surface of a part of the wire guide piece 34, which is remained uncut between the second bent portion 34b and the distal end portion 34c, forms the guide surface 40 facing the wire insertion opening 38. An outer surface of the distal end portion 18e of the claw-shaped portion 18c also forms a guide surface 42 facing the wire insertion opening 38. The guide surfaces 40, 42 are configured so that a distance therebetween are gradually narrowed toward the wire insertion opening 38, thereby defining a lead-in passage having a triangle leg shape. Also, the distal end portion 34c of the wire guide piece 34 is positioned toward the extension portion 18a beyond the distal end portion 18e of the hook 18 and also above the wire holding space 17. As such, it is possible to smoothly guide the wire 50 into the wire holding space 17 when the wire 50 is inserted therein.

Figure 5:
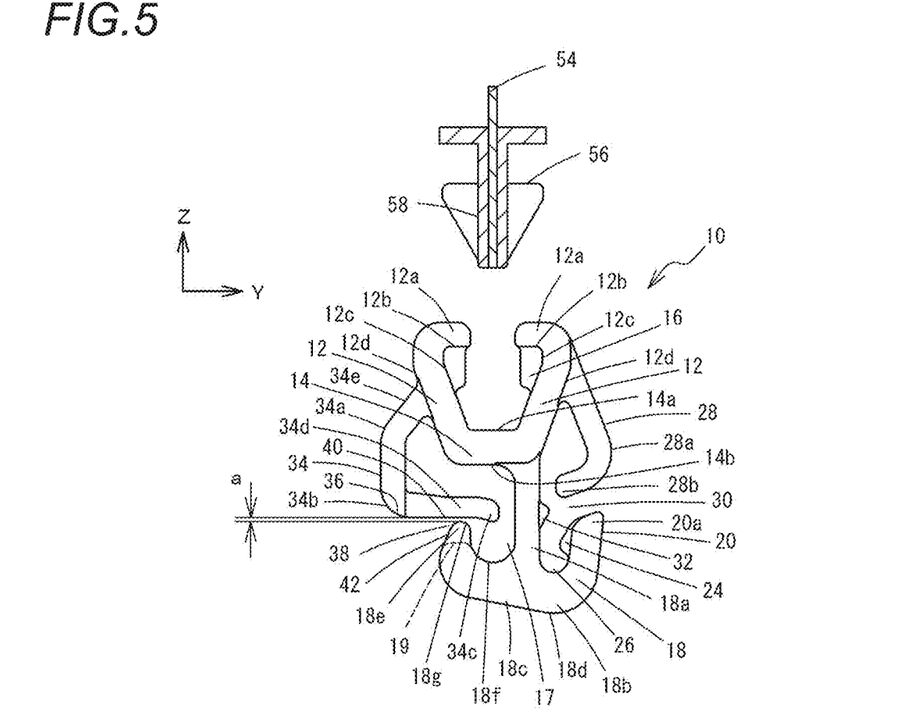
FIG. 5 is a front view showing a method of using the skin-material fixing clip of the present embodiment.

Next, a method of using the skin-material fixing clip 10 of the present embodiment will be described with reference to FIGS. 2 and 5. As shown in FIG. 2, the skin-material fixing clip 10 is used for attaching a skin material 46 at a predetermined location on a surface of a cushion material 44 for a vehicle seat. Here, the cushion material 44 and the skin material 46 will be described. The cushion material 44 is a synthetic resin foam material, such as polyurethane foam, molded in a seat shape. The cushion material 44 has a groove 48 formed to allow the skin material to be fixed therein, and the wire is installed in the groove 48. The wire 50 is a wire material made of metal and can be incorporated into the cushion material 44 by insert-molding during molding of the cushion material 44.

The skin material 46 is a synthetic resin sheet or the like for covering the surface of the cushion material 44 and has a stitched portion 52 at a site thereof corresponding to the groove 48 of the cushion material 44. The stitched portion 52 is formed by aligning end edges of a pair of skin materials 46 with each other with surfaces thereof facing each other, overlapping a locking tape 54 with the aligned end edges and then stitching them together. On a side edge of the locking tape 54 opposite to the stitched portion 52, a locking end material 56 is integrally provided therewith. The locking end material 56 is molded by synthetic resin and is formed in a generally V-shaped cross sectional shape along a length direction of the locking tape 54. The locking end material 56 is mounted on the locking tape 54 by insert-molding one side edge of the locking tape 54 therein. The locking end material 56 is sized to be fitted between the pair of locking claws 12 of the skin-material fixing clip 10 and has locking grooves 58 formed at equal intervals along the length direction of the locking tape 54. The locking grooves 58 are set to have a width and a depth allowing the stoppers 16 of the skin-material fixing clip 10 to be inserted therein.

When the skin material 46 is attached on the cushion material 44, the skin-material fixing clip 10 is first attached at any location on the locking end material 56 of the locking tape 54 attached to the skin material 46. A plurality of skin-material fixing clips 10 are attached at equal intervals along the length direction of the locking end material 56. When the locking end material 56 is pressed in between the pair of locking claws 12, the pair of locking claws 12 are elastically deformed and widened and thus the locking end material 56 passes therebetween. Once the locking end material 56 passes therebetween, the elastic deformation of the locking claws 12 is restored and thus the distal end portions 12a of the pair of locking claws 12 cover an end portion of the locking end material 56 facing the stitched portion 52. Therefore, the locking end material 56 is fitted between the pair of locking claws 12 and thus does not fall out therefrom. At this time, the stoppers 16 of the locking claws 12 are inserted into one of the locking grooves 58 of the locking end material 56, and thus the skin-material fixing clip 10 is not able to be moved along the length direction of the locking end material 56 and is stopped at a certain location.

Subsequently, the stitched portion 52 of the skin material 46, to which the skin-material fixing clips 10 are attached, is arranged to coincide with the groove 48 of the corresponding cushion material 44, and then the hook 18 of each of the skin-material fixing clips 10 is pressed against the wire 50 by a finger or the like. At this time, it is preferable to move the skin-material fixing clip 10 in the right and left direction in order to cause the wire 50 to coincide with the wire insertion opening 38. In this state, if the skin-material fixing clip 10 is further pressed in, the wire 50 is guided along the inclined surface 18d of the claw-shaped portion 18c and thus is led in between the guide surfaces 40, 42 facing the wire insertion opening 38. When the skin-material fixing clip 10 is pressed to be further inserted into the groove 48 of the cushion material 44, the wire 50 is positioned in the lead-in passage defined by the guide surfaces 40, 42 facing the wire insertion opening 38 and then is led into the wire insertion opening 38. The wire insertion opening 38 is configured so that a thinnest width in the vicinity of the center line S is a and smaller than a diameter of the wire 50, and thus in such a state, the wire 50 cannot pass therethrough. However, if the skin-material fixing clip 10 is further pressed from above in the state, the wire guide piece 34 is elastically deformed and thus the wire insertion opening 38 becomes wider than the diameter of the wire 50. Then, the wire 50 enters the wire holding space 17 through the wire insertion opening 38. At this time, the wire 50 hits against the extension portion 18a of the hook 18 due to a momentum thereof upon passing, and after the wire 50 passes through the wire insertion opening 38, the elastic deformation of the wire guide piece 34 is restored, thereby generating a click feeling. The wire insertion opening 38 is restored so that the width thereof in the vicinity of the center line S becomes the distance a, thereby preventing the wire 50 from falling out. In this way, the skin-material fixing clips 10 are locked on the wire 50, and the skin materials 46 attached to the skin material fixing clips 10 are attached on the surface of the cushion material 44 with the end edges thereof inserted in the groove 48.

Figure 9:
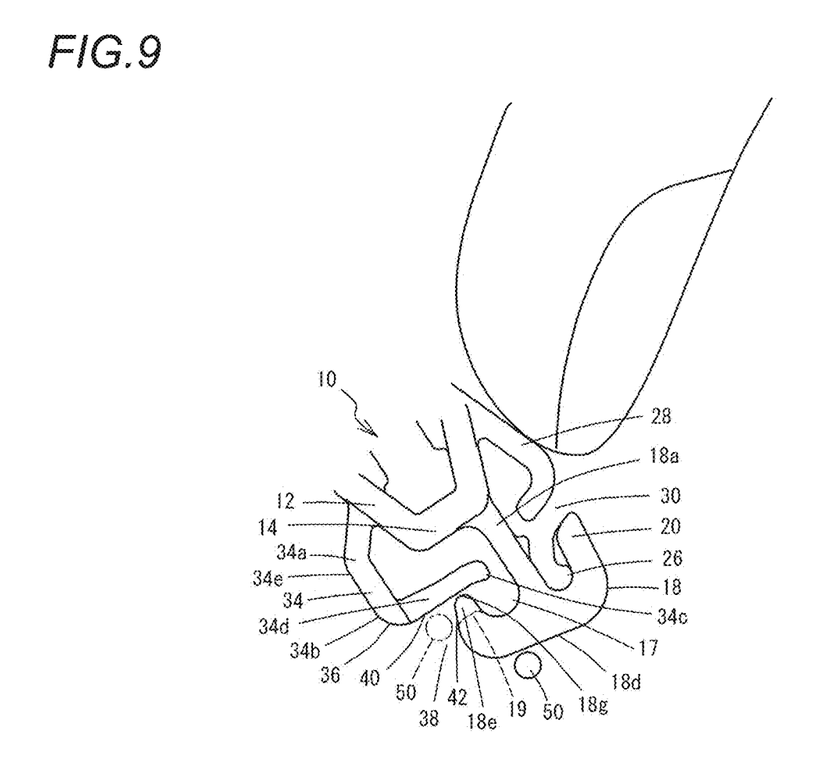
FIG. 9 is a front view showing a method of attaching the skin-material fixing clip of the present embodiment to a wire.
Figure 10:
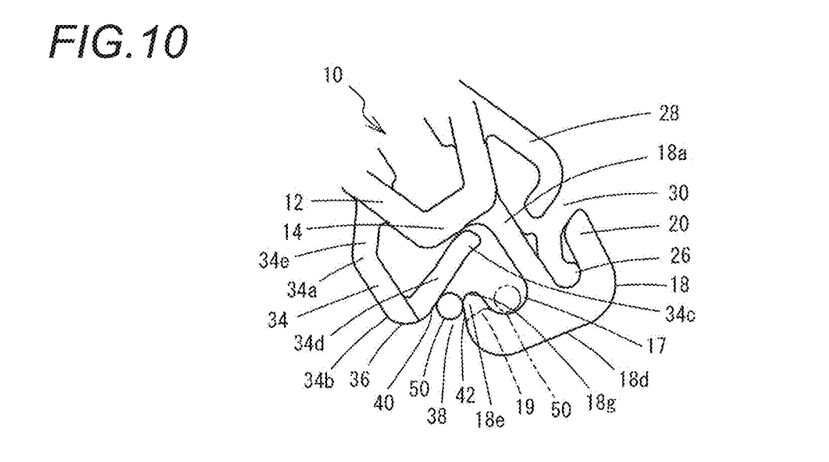
FIG. 10 is a front view showing a method of attaching the skin-material fixing clip of the present embodiment to a wire.

Also, as shown in FIG. 9, when the skin-material fixing clip 10 is attached while being held by a fingertip, the wire 50 is likely to come in contact with the flange portion 18b of the hook 18 if the wire 50 is located on the right side of the wire insertion opening 38 in the figure and the skin-material fixing clip 10 is inclined. Even in this case, if the skin-material fixing clip 10 is moved in the right direction, the wire 50 is guided by the guide surfaces 40, 42 and led into the wire insertion opening 38, so that the wire 50 is positioned at a location of a wire 50 shown by a two-dot chain line. In this state, as the skin-material fixing clip 10 is pressed from above, the wire guide piece 34 is elastically deformed at the second bent portion 34b to approach the locking claw base portion 14 as shown in FIG. 10. Thus, the wire insertion opening 38 is widened and the wire 50 enters and is locked in the wire holding space 17. At this time, when the skin-material fixing clip 10 is pressed by the fingertip, the skin-material fixing clip 10 can be easily pressed by the fingertip due to presence of the jig guide piece 28.

Figure 11:
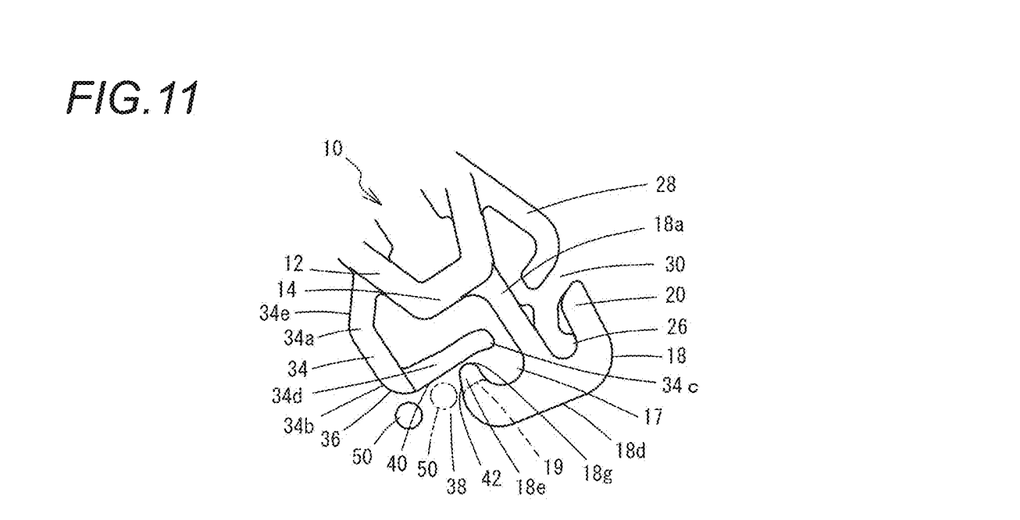
FIG. 11 is a front view showing another method of attaching the skin-material fixing clip of the present embodiment to a wire.

Further, as shown in FIG. 11, when the wire 50 is located on the left side of the wire insertion opening 38 in the figure, the wire 50 comes in contact with the vicinity of the second bent portion 34b of the wire guide piece 34. In this case, if the skin-material fixing clip 10 is moved in the left direction so that the wire 50 coincides with the vicinity of the wire insertion opening 38, the wire 50 can be inserted and locked in the wire holding space 17 by operations as described above.

When the skin-material fixing clip 10 is separated from the wire 50, a long rod-shaped jig (not shown) is used. The jig is provided at a distal end thereof with a locking portion, and the locking portion is provided to have a thickness greater than a gap of the jig insertion opening 30 between the jig guide piece 28 and the jig receiving portion 20. The jig is inserted into a part of the groove 48 of the cushion material 44, in which the jig receiving portion 20 of the skin-material fixing clip 10 is located, and then is inserted and pressed in between the jig guide piece 28 and the jig receiving portion 20. Then, the locking portion on the distal end of the jig comes in contact with the engaging protrusion 24, and if the locking portion is further pressed in, the jig receiving portion 20 is elastically deformed and widened. If the locking portion passes therethrough, the shape of the jig receiving portion 20 is restored and thus the locking portion enters the jig holding space 26 below the engaging protrusion 24 and cannot exit therefrom. Also, when the locking portion passes through the jig insertion opening 30, the locking portion is guided by the jig holding protrusion 32 while being in contact therewith, thereby ensuring that the locking portion enters the jig holding space 26.

Subsequently, if the jig is drawn up, a moment is exerted on the skin-material fixing clip 10 so that the skin-material fixing clip 10 is rotated counterclockwise about the wire 50. Then, the wire 50 is guided by the distal end portion 18e of the claw-shaped portion 18c of the hook 18 and the distal end portion 34c of the wire guide piece 34 and thus is positioned in the wire insertion opening 38. In this state, when the skin-material fixing clip 10 is further drawn up, the wire 50 hits against the vicinity of the distal end portion 34c of the wire guide piece 34, and thus the wire guide piece 34 is elastically deformed in a direction in which the distal end portion 34c approaches the locking claw base portion 14, thereby widening the wire insertion opening 38. Eventually, the wire 50 passes through the widened wire insertion opening 38. In this way, the skin-material fixing clip 10 is separated from the wire 50 and thus the skin material 46 is also separated from the cushion material 44.

According to the skin-material fixing clip 10 of the present embodiment, it is possible to lock the skin-material fixing clip 10 on the wire 50 by a simple operation and thus to easily and reliably attach the skin material 46 on the cushion material 44. In particular, when the skin-material fixing clip 10 is inserted into the groove 48 of the cushion material 44 by pressing the jig receiving portion 20 while holding the skin-material fixing clip 10 by a finger, the entire skin-material fixing clip 10 is likely to be inclined so that the skin-material fixing clip 10 is pressed down against a force pulled by the skin material 46. However, even in the inclined state, the wire insertion opening 38 is oriented downward, and also the triangle leg-shaped lead-in passage defined by the guide surface 40 and the guide surface 42 facing the wire insertion passage 38 is formed to be flared downward, so that the skin-material fixing clip 10 can be easily locked on the wire 50 only by pressing the skin-material fixing clip 10 against the wire 50 generally in the vicinity of the wire insertion passage 38. Thus, even when the wire 50 is offset from the wire insertion passage 38, the wire 50 can be guided by the guide surfaces 40, 42 to coincide with the wire insertion passage 38, simply by pressing the skin-material fixing clip 10 in a wide range as shown in FIGS. 9 and 11 and also moving the skin-material fixing clip 10 in the right and left direction. Accordingly, the locking operation can be simply performed. Also, since it is unnecessary to precisely position the skin-material fixing clip 10, the skin-material fixing clip 10 can be simply operated within the groove 48 of the cushion material 44. For example, it is unnecessary to press and deform the cushion material 44 so that the wire 50 is visible. Thus, the operation can be effectively performed with a weak force and does not require skills, so that the skin-material fixing clip 10 can be simply attached by any persons. Further, the skin-material fixing clip 10 can be separated from the wire 50 by a simple operation using the jig, and thus a work efficiency upon removal thereof is also good.

Since the locking claws 12 are provided with the stoppers 16 and also the stoppers 16 are inserted into the locking groove 58 of the locking end material 56, the skin-material fixing clip 10 is locked at a certain location and is not able to be moved along the length direction of the locking tape 54. Accordingly, the skin material 46 is not displaced relative to the cushion material 44 and wrinkles or sagging is not occurred in the skin material 46. Thus, the skin material 46 can be cleanly attached so that a good appearance is obtained. Since the locking end material 56 has the locking grooves 58 formed at equal intervals, flexibility thereof is increased and the operation is facilitated.

Further, the distal end portion 34c of the wire guide piece 34 extends beyond the distal end portion 18e of the hook 18 and reaches the vicinity of the extension portion 18a of the hook 18. Also, the distal end portion 34c is positioned to protrude at an angle nearly parallel to a bottom portion of the wire holding space 17. Accordingly, the wire 50 inserted in the wire holding space 17 comes in contact with the distal end portion 34c when moving toward the wire insertion opening 38, so that the wire 50 cannot carelessly be fallen out from the skin-material fixing clip 10, thereby preventing the wire 50 from being carelessly fallen out therefrom. The wire guide piece 34 is provided with the first bent portion 34a and the second bent portion 34b in the middle thereof, and thus a length of the wire guide piece 34 can be increased so that flexibility due to elastic deformation is obtained. Since the wire guide piece 34 is connected to the locking claw 12, the length thereof can be increased as compared with a case where the wire guide piece 34 is connected to the locking claw base portion 14. Accordingly, even in the case of the same material and same cross-sectional shape, the wire guide piece 34 can be easily elastically deformed, thereby allowing the wire 50 to easily pass therethrough. The vicinity of the distal end portion 34c of the wire guide piece 34 has a straight line shape substantially perpendicular to the extension portion 18a of the hook 18, and the wire 50, which has passed through the wire insertion opening 38, is guided by the distal end portion 34c to strongly hit against the extension portion 18a in a direction substantially perpendicular thereto. Thus, when the wire 50 enters the wire holding space 17, a click feeling can be reliably generated, and as a result, it can be confirmed that the skin-material fixing clip 10 is attached on the wire 50. When the skin-material fixing clip 10 is separated from the wire 50, the wire 50 comes in contact with the distal end portion 34c of the wire guide piece 34 in a direction intersecting an extending direction thereof, so that the wire guide piece 34 can be easily elastically deformed, thereby allowing separation of the skin-material fixing clip 10. The vicinity of the distal end portion 34c of the wire guide piece 34 is cut out to be narrower, and as a result, the elastic deformation is facilitated as well.

Since the wire insertion opening 38 is provided with wider voids on both sides of the center line S in the X-axis direction, a can be set to be narrower than a thickness of a mold used in manufacturing, so that the wire 50 is hardly fallen out and can be securely held. The distal end portion 34c of the wire guide piece 34 and the distal end piece 18e of the hook 18 are provided in a staggered manner to provide spaces, which are wider than a certain size, in different directions, thereby allowing the mold to be removed in the different directions and also making the wire insertion opening 38 narrower. In this way, the wire insertion opening 38 can be set to be narrower without being influenced by the mold. A thickness of the mold can be increased to enhance durability of the mold, and thus the mold having the enhanced durability can be used.

The base end portion of the hook 18 is formed to have a thickness twice that of the distal end portion 18e and the base end portion of the wire guide piece 34 is formed to have a thickness twice that of the elastic piece portion 34d and the distal end portion 34c, so that the base end portions have an increased strength. Also, the base end portions are provided to coincide with each other in the Y-axis direction perpendicular to the inserting direction of the wire 50, so that the wire 50 can be sandwiched from both sides, thereby providing an enhanced attachment strength.

Also, urethane, which is a material for the cushion material 44, is easily adhered on the wire 50 and thus is likely to interfere with locking of the skin-material fixing clip 10, but since the wider voids are provided around the wire insertion opening 38, the urethane is removed through gaps if the skin-material fixing clip 10 is strongly pressed against the wire 50, thereby ensuring a reliable locking of the skin-material fixing clip 10. Since the wire insertion opening 38 is narrowest in the vicinity of the centerline S and thus has a small contact surfaces with the urethane, the skin-material fixing clip 10 can be attached while peeling the urethane off the wire 50. Therefore, it is unnecessary to make the efforts to previously remove the urethane adhered on the wire 50, thereby enhancing the work efficiency.

Further, the skin-material fixing clip of the present invention is not limited to the foregoing embodiments, but changes in detailed shape, size and the like can be appropriately made. The vicinities of the distal end portion of the hook and the distal end portion of the wire guide piece may be provided to reach locations overlapping each other as viewed in the X-axis direction. A material, surface finish, color and the like for the skin-material fixing clip 10 can be freely selected. Although the skin-material fixing clip has been described as being configured so that a width in a thickness direction intersecting a direction, in which the pair of the locking claws face each other, is set to be relatively wider in the locking claws and the locking claw base portion and to be relatively narrower in the hook, the jig receiving portion, the wire guide piece and the jig guide piece, they may have the same width or may be configured in reverse. But, it is preferable that the wire guide piece or the jig guide piece have narrower widths in order to ensure deformability thereof. Although the distal end portions of the locking claws has been described as being formed in a chamfered shape, the distal end portions may have a rectangular shape. But, the chamfered shape can reduce catching of the locking claws on the locking end material.

DESCRIPTION OF REFERENCE NUMERALS

10 Skin-Material Fixing Clip
12 Locking Claw
14 Locking Claw Base Portion
16 Stopper
17 Wire Holding Space
18 Hook
18a Extension Portion 18b Flange Portion
18c Claw-Shaped Portion
18d Inclined Surface
18e Distal End Portion
18f Groove Portion
18g End Surface
20 Jig Receiving Portion
21a First End Portion
21b Second End Portion
34 Wire Guide Piece
34a First Bent Portion
34b Second Bent Portion
34c Distal End Portion
34d Elastic Piece Portion
38 Wire Insertion Opening
40, 42 Guide Surface
44 Cushion Material
46 Skin Material
48 Groove
50 Wire
56 Locking End Material
58 Locking Groove

The invention claimed is:

1. A skin-material fixing clip for connecting a skin material with a cushion material and provided with a locking section configured to be locked on a locking end material provided on an end edge of the skin material, and a hook configured to be locked on a wire installed in the cushion material,
   wherein the hook is provided below the locking section and the hook is provided with an extension portion extending downward from the locking section and a claw-shaped portion extending laterally from a distal end of the extension portion,
   wherein the locking section is provided with a wire guide piece,
   wherein the wire guide piece extends downward from the locking section and then is provided with a bent portion in the middle thereof to be bent and extended toward a distal end portion of the claw-shaped portion of the hook, wherein a distal end portion of the wire guide piece is positioned so that a wire insertion opening having a predetermined gap and configured to allow the wire to be inserted therethrough is formed between the distal end portion and the distal end portion of the claw-shaped portion,
   wherein a groove portion surrounded by the claw-shaped portion and the extension portion defines a wire holding space extending along an inserting direction of the wire,
   wherein parts of the wire guide piece and the claw-shaped portion facing the wire insertion opening defines guide surfaces, respectively, and
   wherein the distal end portion of the wire guide piece is located on one side of a center line of the clip and the distal end portion of the claw-shaped portion is located on an opposite side of the center line and the center line extends downward from the locking section.

2. The skin-material fixing clip according to claim 1, wherein an elastic piece portion, which extends from the bent portion to the distal end portion of the wire guide piece is located on the one side of the center line of the clip, and the distal end portion of the claw-shaped portion is located on the opposite side of the center line, wherein the guide surface of the wire guide piece is parallel to an extending direction of the groove portion.

3. The skin-material fixing clip according to claim 2, wherein the wire guide piece is formed so that a thickness of the elastic piece portion in a direction along the guide surface is thinner than a thickness of a part of a base portion, which extends from the locking section to the bent portion, in a direction along the guide surface.

4. The skin-material fixing clip according to claim 1, wherein the distal end portion of the claw-shaped portion of the hook is formed to have a first end portion protruding toward the locking section and a second end portion opposing the guide surface of the wire guide piece and protruding toward the locking section.

5. The skin-material fixing clip according to claim 1, wherein a distance between the guide surfaces, respectively, of the wire guide piece and the claw-shaped portion is gradually narrowed toward the wire insertion opening.

6. The skin-material fixing clip according to claim 1, wherein the distal end portion of the wire guide piece is positioned above the distal end portion of the claw-shaped portion.

7. The skin-material fixing clip according to claim 6, wherein the distal end portion of the wire guide piece is positioned closer to the extension portion compared to the distal end portion of the claw-shaped portion.

8. The skin-material fixing clip according to claim 7, wherein the wire guide piece extends in a direction away from the extension portion as the wire guide piece goes downward from the locking section, and then is provided with the bent portion to be bent and extended toward the distal end portion of the claw-shaped portion of the hook.

9. The skin-material fixing clip according to claim 1, wherein the hook has a flange portion extending in a direction opposite to an extending direction of the claw-shaped portion of the extension portion, wherein the flange portion has a distal end formed to be inclined in a direction away from the locking section, wherein a jig receiving portion configured to allow a jig for separating the hook from the wire to be locked therein, is provided on the distal end of the flange portion.

10. The skin-material fixing clip according to claim 1, wherein the locking section, the hook and the wire guide piece are integrated and made from synthetic resin.

11. The skin-material fixing clip according to claim 1, wherein the wire guide piece is configured to be elastically deformed so that the distal end portion of the wire guide piece approaches a base portion of the locking section when the wire enters to the wire holding space.

12. The skin-material fixing clip according to claim 1, wherein the wire guide piece extends toward a distal end portion of the claw-shaped portion of the hook to the extent that the wire guide piece is positioned above the distal end portion of the claw-shaped portion of the hook.

* * * * *

UNITED STATES PATENT AND TRADEMARK OFFICE
CERTIFICATE OF CORRECTION

PATENT NO. : 10,618,800 B2
APPLICATION NO. : 15/571036
DATED : April 14, 2020
INVENTOR(S) : Genta Matsumura et al.

Page 1 of 1

It is certified that error appears in the above-identified patent and that said Letters Patent is hereby corrected as shown below:

In the Specification

In Column 8, Line 47, delete "90o." and insert -- 90°. --, therefor.

Signed and Sealed this
Fourth Day of August, 2020

Andrei Iancu
*Director of the United States Patent and Trademark Office*